United States Patent [19]
Batcher

[11] 3,936,806

[45] Feb. 3, 1976

[54] SOLID STATE ASSOCIATIVE PROCESSOR ORGANIZATION

[75] Inventor: Kenneth E. Batcher, Stow, Ohio

[73] Assignee: Goodyear Aerospace Corporation, Akron, Ohio

[22] Filed: Apr. 1, 1974

[21] Appl. No.: 457,155

Related U.S. Application Data

[63] Continuation-in-part of Ser. No. 270,903, July 12, 1972, abandoned.

[52] U.S. Cl. .............................................. 340/172.5
[51] Int. Cl.² ...................... G06F 7/00; H03K 19/00
[58] Field of Search ........... 340/172.5, 174 PW, 173

[56] References Cited
UNITED STATES PATENTS

| | | | |
|---|---|---|---|
| 3,189,879 | 6/1965 | MacIntyre et al. | 340/172.5 |
| 3,277,449 | 10/1966 | Shooman | 340/172.5 |
| 3,287,703 | 11/1966 | Slotnick | 340/172.5 |
| 3,339,181 | 8/1967 | Singleton et al. | 340/172.5 |
| 3,473,160 | 10/1969 | Wahlstrum | 340/172.5 |
| 3,535,694 | 10/1970 | Anacker et al. | 340/172.5 |
| 3,618,041 | 11/1971 | Horikoshi | 340/172.5 |
| 3,647,348 | 3/1972 | Smith et al. | 340/172.5 |
| 3,670,308 | 6/1972 | Tutelman | 340/172.5 |
| 3,681,761 | 8/1972 | Schuenemann et al. | 340/172.5 |
| 3,681,763 | 8/1972 | Meade et al. | 340/173 |
| 3,685,020 | 8/1972 | Meade | 340/172.5 |
| 3,757,312 | 9/1973 | Shore et al. | 340/172.5 X |
| 3,763,472 | 10/1973 | Sharp | 340/172.5 |
| 3,800,289 | 3/1974 | Batcher | 340/172.5 |
| 3,812,467 | 5/1974 | Batcher | 340/172.5 |
| 3,863,233 | 1/1975 | Eddey et al. | 340/172.5 X |

*Primary Examiner*—Gareth D. Shaw
*Assistant Examiner*—Michael C. Sachs
*Attorney, Agent, or Firm*—Oldham & Oldham

[57] ABSTRACT

The invention relates to a unique solid state computer organization. Essentially, the system comprises a plurality of associative arrays wherein each associative array comprises parallel processing apparatus and a solid state memory capable of being accessed in either a word-oriented or a bit-oriented mode. The associative processor apparatus within each associative array provides for the parallel processing of data within the associative arrays in either of the two modes. Control apparatus within the system provides for the parallel control of the plurality of associative arrays at a speed conducive to the data processing speed of the associative arrays. Rapid speed of the control apparatus is economically achieved by the arrangement of a plurality of separate and characteristically distinct control memory elements.

5 Claims, 3 Drawing Figures

SOLID STATE ASSOCIATIVE PROCESSOR ORGANIZATION

This is a continuation-in-part of U.S. Pat. Application Ser. No. 270,903 filed July 12, 1972 and now abandoned.

BACKGROUND OF THE INVENTION

Heretofore it has been known that the apparatus of a digital computer might be arranged in a manner such as to allow accessing to the data storage bits of the computer memory in either of two distinct modes. That is, it has been taught that a system might be developed whereby data can be written into the memory in a word-oriented mode and read from the memory in a bit-oriented mode or vice-versa. That is, data might be written into the memory such that all bits of one word are written simultaneously and one bit of all words are read simultaneously or conversely, one bit of all words are written simultaneously and all bits of one word are read simultaneously. However, "corner-turning" problems have been inherent in prior techniques. These "corner-turning" problems are well understood by those skilled in the art. An oft-used example of such problems is the acquisition, storage, and accessing of radar data. It can be readily understood that if a radar system acquires a plurality of data at various ranges on one azimuth and stores that data in an azimuth-oriented manner and does this for several azimuths it must then devise a unique method to access this stored data if it later desires to access all data at the same range but different azimuths. In other words, if data is acquired and stored in an azimuth-oriented mode and is later to be accessed in a range-oriented mode then unique apparatus or methods must be utilized to make such accessing. In the past, systems have required either complex logic circuitry, redundancy of circuitry or an increased number of memory access lines so as to be above to "turn the corner" from a bit-oriented access to a word-oriented access or vice-versa. Particular approaches toward circumventing the "corner-turning" problem have been numerous. A typical approach to the solution has been shown in U.S. Letter Pat. 3,277,449 for the Orthogonal Computer designed by William Shooman. Certain articles by Mr. Shooman further define and enhance the teachings of this patent. Particularly, chapter 15, entitled "Orthogonal Processing" of the book *Parallel Processor Systems, Technologies and Applications* edited by L. C. Hobbs and published by Spartan Books in 1970 basically outlines the teachings of the patent. It is readily observable from an understanding of the Shooman Patent that the invention described therein requires both vertical and horizontal accessing means, and vertical and horizontal arithmetical means. In other words, the Shooman invention, and others which have sought to circumvent the "corner-turning" problem, fundamentally teach two separate computers operating upon the same memory. Such systems are extremely expensive due to the requirements of the duplication of access circuitry and arithmetic units.

Further, it has been known that computer systems known as associative processors might be designed whereby arithmetic, search, or other logical operations might be performed upon a plurality of data simultaneously. Such systems have proven themselves to be quite effective in the rapid processing of data. However, heretofore such systems have generally been quite inflexible as to mode of operation; that is, such systems have been capable of simultaneously processing all bits of one word, or one bit of all words, but no given system has been capable of performing simultaneous operations in both modes without the duplication of much of its circuitry such as to use different logic and arithmetic circuitry for each of the two modes.

Therefore, it is the general object of the instant invention to present a novel solid state associative processor organization wherein a unique solid state memory array is coupled with the key apparatus of an associative processor to form an associative array wherein associative or parallel operations may be performed upon data in either a word-oriented or a bit-oriented mode and wherein each mode utilizes the same read-write lines and arithmetic unit.

A further object of the invention is to provide a solid state associative processor organization wherein a plraulity of the aforementioned associative arrays may be operated upon in parallel so as to be capable of simultaneously receiving and processing data from a large number of sources.

A further object of the invention is to provide a control system whereby the control programs necessary for the parallel operation of a plurality of associative arrays may themselves be processed with a speed conducive to that of the associative arrays.

Still a further object of the invention is to provide a unique computer organization which is not only capable of the parallel processing of a large volume of data from various sources and capable of processing the control program with a speed conducive to the data processing speed of the system, but to do so in a manner which is accurate in operation, highly flexible, adaptable to various uses, and quite economical.

The aforesaid objects of the invention and other objects which will become apparent as the description proceeds are achieved by a digital computer wherein operations may be simultaneously performed on a plurality of data in both a bit-oriented mode and a word-oriented mode comprising a plurality of solid state memory arrays, the data storage arrangements of which are such that access may be made to the data storage bits thereof in either a bit-oriented mode or a word-oriented mode, and of such character that a single set of data input/output lines is required for writing data into the arrays or reading data from the arrays in both modes and a plurality of arithmetic units, one associated with each solid state memory array, providing the means for performing, in both word-oriented and bit-oriented modes, parallel logical and arithmetic operations on the data associated with the solid state memory arrays.

For a better understanding of the invention, reference should be had to the accompanying drawings wherein.

Figure 1:
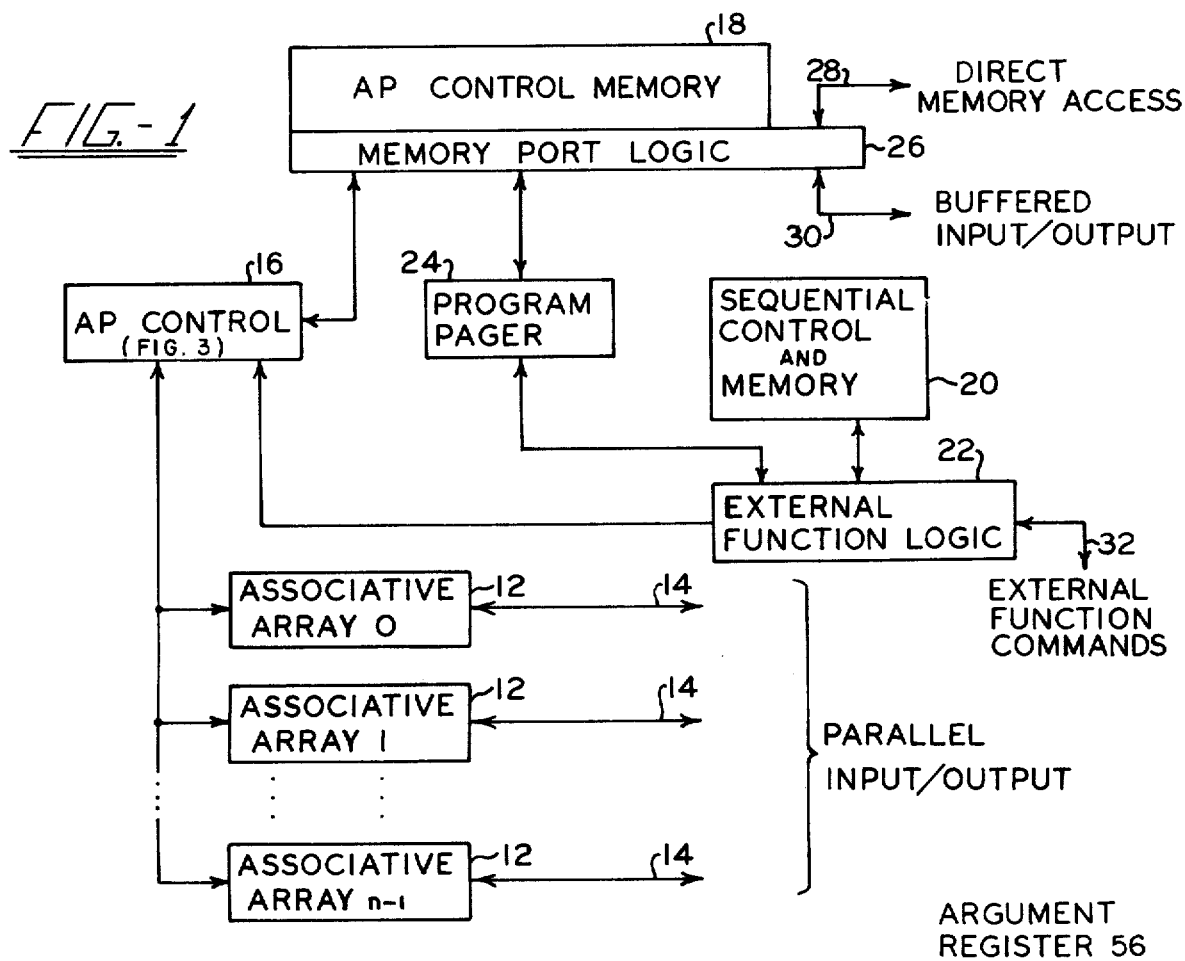
FIG. 1 shows the basic block diagram of the solid state associative processor organization.

Referring now to the drawings and more particularly FIG. 1, a generalized block diagram of the embodiment of the invention may be seen. The computer organization described herein contains three separate memory systems; associative arrays 12, AP control memory 18, and sequential control and memory 20. These separate memory systems allow memory cycle times to be overlapped, thus enhancing the data processing capability and speed of the invention. The control elements of the invention, AP control 16, program pager 24, external function logic 22, and memory port logic 26 allow the fast processing capability of the associative arrays to be dynamically controlled and applied to the changing requirements of any given application. The input/output means; parallel input/output 14, direct memory access 28, buffered input/output 30, and external function commands 32 provide for the rapid transfer of data and control signals to the system.

MEMORY ORGANIZATION

As mentioned above, the instant invention contains three separate and distinct memory systems. As these memory systems are discussed hereinbelow, it will be seen that each of the elements of the three has been selected and arranged such as to economically achieve the ultimate in data processing speed.

Figure 2:
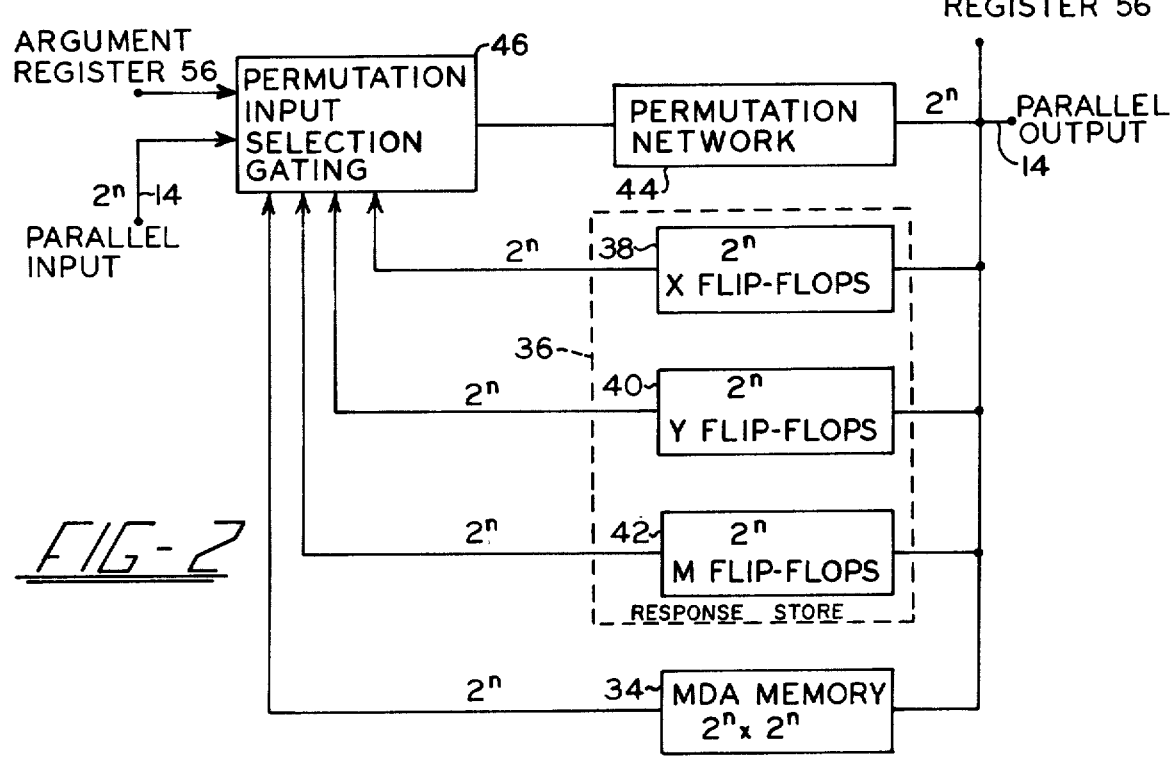
FIG. 2 illustrates the block diagram of an associative array.

The associative arrays 12 are shown more particularly in FIG. 2. Here it is shown that the storage element of the associative array 12 in the multi-dimensional access solid state memory, MDA memory 34, the subject of co-pending patent application Ser. No. 253,388 filed May 15, 1972, now U.S. Pat. NO. 3,800,289, and assigned to Goodyear Aerospace Corporation of Akron, Ohio. Although the MDA memory 34 shown in FIG. 2 is a square memory, that is it contains $2^n$ words each containing $2^n$ bits, it should become quite apparent to one skilled in the art that the concepts of the instant invention are readily applicable to systems which may utilize non-square MDA memories also. In the preferred embodiment, each MDA memory 34 contains $2^{2n}$ bits, comprising $2^n$ words containing $2^n$ bits, of solid state storage. By use of a unique data storage arrangement within the MDA memories 34 simultaneous access may be made to the data storage bits of the memories in either the bit or word direction; that is, one bit of all words or all bits of one word may be accessed simultaneously.

Although reference to the above designated patent application should be made for a complete understanding of the MDA memory, a few characteristics of that invention will herein be described to facilitate an understanding of the instant invention. A $2^n$ word by $2^n$ bit MDA memory is readily constructed from $2^n$ solid state memory modules each containing $2^n$ bits. Each memory module has one input line by which data may be written into memory, one output line from which data may be read from memory, and $n$ address lines whereby any of the $2^n$ bits contained within the memory module may be addressed. Regardless of whether the MDA memory is to be operated on in a bit-oriented mode or a word-oriented mode, the fata to be written into any given solid state memory module will always be placed on the same input line, and the data to be read from any given solid state memory module will always be found on the same output line. In other words, the input and output means of each MDA memory are exactly the same regardless of the mode of operation. The mode of operation is determined solely by the inter-relationships of the states of the address lines of the individual modules.

As is clearly defined in the above referenced application, an MDA memory array constructed from $2^n$ address line encoded binary solid state memory modules will have associated therewith a unique data storage technique to achieve the desirable multi-mode accessability. In general, if each of the $2^n$ memory modules is designated by a unique $n$-element binary vector index M and if each of the $2^n$ data storage words is similarly indexed with a unique $n$-element binary vector W, and if the $2^n$ bits are correspondingly designated by unique $n$-element binary vectors B then the following data storage rules will be observed:

Bit B of module M will contain bit B of word W in accordance with the formula $M = B \oplus W$, where $\oplus$ means addition modulo 2.

It should be readily apparent then to one skilled in the art that each memory module M will contain one bit of each of the stored words W and no memory module will contain more than one bit of each of the words. With each memory module containing one bit of each word and no similar bits of any two words, it should be readily apparent that it is possible to access all of the bits of one word or one bit of all words by simultaneously accessing all of the memory modules.

By utilizing the solid state memory modules hereinabove described, an MDA array 34 may be easily constructed. Such an array would require $2^n$ selection lines for providing addressing to the array. A set of X selection lines, designated by a binary vector X and a set of Y selection lines, designated by the binary vector Y. The $n$ address lines of each module will connect to $n$ of these X-Y selection lines. Only one address line per memory module will go to any particular selection line. The rule for connecting module address lines to array selection lines is expressed as follows: Address line $k$ of memory module M connects to $x_k$ if $m_k = 0$ or to $y_k$ if $m_k = 1$. Where $x_k$, $y_k$ and $m_k$ are the $k^{th}$ elements of the respective binary vectors X, Y, and M. As a result, each X line connects to one half of the modules and the corresponding Y line to the other half.

With an array constructed as described directly above, operation may be easily achieved in a bit-oriented, or associative processor, type mode. To access any bit B of all words, the state of the X selection lines and the state of the Y selection lines are set to equal B. That is, $X = Y = B$. Each module then selects a bit B of its contents which is bit B of word ($B \oplus M$). The result is that bit B of each word is accessed. In such an instant however the words, as referenced to the modules, are not in order and the word order varies as a function of B; $W = B \oplus M$. A permutation network is required such that the data associated with each word's bits may be placed at the same location for each bit. The specific operation of the permutation network is discussed hereinafter.

The MDA array 34 may of course be operated in a word-oriented mode, or for use in a general purpose digital computer. If W is the binary vector index of the memory word to be accessed, then X is set to equal W. At this point, all memory module address lines of those modules wherein $m_k = 0$ will be set to the state $w_k$ or $w_k \oplus m_k$. Similarly, Y is set to equal $\overline{W}$ such that all memory module address lines for those modules where $m_k = 1$ will be set to the state $\overline{w}_k$ or $w_k \oplus m_k$. Therefore, considering the X and Y array selection lines together it follows that each module M receives address $B = W \oplus M$. At address B of module M is bit B of word $(M \oplus B) = W$. Hence each bit of word W may be accessed by setting $X = W$ and $Y = \overline{W}$. The accessed bits however are not in order as referenced to the modules but vary as a function of $W$; $B = W \oplus M$. Here again a permutation network is necessary for arranging the order of data into or out of the memory. Again, the function of the permutation network in this regard will be discussed hereinafter.

Associated with each MDA memory 34, is a single response store 36, the elements of which are the subject of co-pending patent application Ser. No. 344,316 filed Mar. 23, 1973, now U.S. Pat. No. 3,863,233, and assigned to Goodyear Aerospace Corporation of Akron, Ohio. The response store 36 performs the arithmetic and logic function required in processing the data associated with the associative array. In the preferred embodiment utilizing $2^n$ by $2^n$ MDA arrays, the response store will contain $2^n$ elements, each element containing three flip-flops. A Y flip-flop 40 generally will contain the results of search, arithmetic, and logical operations; an X flip-flop 38 is generally used to store intermediate results; and an M flip-flop 42 masks or selects the words participating in the desired associative operation. The M flip-flops provide the important and necessary feature of allowing the selection of operation subsets from the total memory content, such that operates may be performed on these subsets without disturbing the contents of unselected bits.

As is clearly related to the above-identified copending patent application, a simple J-K flip-flop may be utilized in conjunction with the output of the memory array 34 and two timed logic pulses to generate all sixteen logical functions which are capable to be generated between two variables. This flip-flop is referred to as the Y flip-flop. As is shown in the illustration of FIG. 2, the X and Y flip-flops are interconnected such that intermediate data from the operations performed by the Y flip-flops and the above referenced control signals can be temporarily stored in the X flip-flops. Hence the X and Y flip-flops in conjunction with each other provide means for presenting the results of two operations such that the results thereof may be utilized to control a final logical operation. The utilization of a flip-flop to control, by the output thereof, the enabling or inhibiting of a gate is of course well known in the art. The third flip-flop, the M flip-flop, is also an inhibiting or enabling type of flip-flop which provides for the selection of the words or bits participating in a particular logical operation or array interrogation. Again, this masking is believed to be well known in the art.

Of key importance in the associative array 12 is a permutation network 44, the subject of co-pending patent application Ser. No. 291,850 filed Sept. 25, 1972, now U.S. Pat. No. 3,812,467, and assigned to Goodyear Aerospace Corporation of Akron, Ohio. This network provides the necessary function of arranging the lineal order of data into and out of the MDA memories 34 such that in either a word-oriented access or a bit-oriented access the data into or out of the MDA memory 34 will be in a consistent logical order. The permutation input selection gating 46 selects the data whose lineal order is to be permuted, that data coming from either the response store 36, the MDA memory 34, the parallel input 14, or the argument register 56 to be discussed hereinafter. Such a circuit may be constructed of data selectors similar to those comprising the permutation network as will be discussed below.

The specific structure of the permutation network is of course clearly related in the above-mentioned patent application. Suffice it to say for this application that the permutation network arranges the order of data into or out of the response store or data interface such that the data associated with each memory module $M$ may always be placed at some unique position $P$ in the data interface where $P = X \oplus M$. Of course, $P$, $X$, and $M$ are all unique $n$-element binary vectors. In bit-oriented mode, $X$ is set to equal B; therefore, $P = B \oplus M = W$; that is, in bit-oriented mode the data associated with any particular word $W$ will always be placed at the same unique location $P$ in the response store or data interface. In word-oriented mode, $X$ is set to equal $W$; therefore, $P = W \oplus M = B$; that is, in word-oriented mode, the data associated with any particular bits B will always be located at the same unique position P in the response store data interface. Thus it can be seen, the purpose of the permutation network is to direct the transfer of the data from the response store to the memory of from the memory to the response store in accordance with the mode of access being made to the memory.

A permutation network capable of performing the desired function may readily be constructed of commonly available $k$-channel data selectors. A plurality of such data selectors are arranged into $r$ levels such that any level $z$ contains $2^n$ $k_z$-channel data selectors, the outputs of which are the inputs of the data selectors in a succeeding level $(z + 1)$, where $z$ is less than or equal to $(r-1)$ such that the relationship among $n$, $r$, and $k_z$ is given by the equation $n = \sum_{z=0}^{r-1} \log_2 k_z$.

In the permutation network contemplated for use in the instant application, all of the channel select input lines of data selectors in any given level are joined together and connected to an appropriate circuit, preferably a binary register, the output of which is controlled by the permutation function X. Thus the data on the input lines of the permutation network is channeled through the various data selectors thereof in accordance with the output of the register containing the permutation code X and the data appears on the output lines of the permutation network in accordance therewith.

With reference to the above attenuated description of the operation and construction of a simplified permutation network, generalized wiring rules for any permutation network may be presented. A typical logic data selector adaptable for use in the construction of a permutation network is the four-channel data selector, MC1228, manufactured by Motorola Semi-conductor Incorporated of Phoenix, Arizona. Such a data selector would typically have four data inputs, $D_0$ through $D_3$, one data output, and two binary-coded channel select inputs, $C_0$ and $C_1$, by which any of the four data inputs may be selected to appear on the output. In the permutation network the output lines of the data selectors on one level comprise the input lines of the data selectors in the succeeding level. The data selectors are labelled with binary vector indices and the output line of any data selector is accorded the binary vector index of that data selector.

It should be appreciated that a permutation network permutes the lineal order of data in a series of steps, these steps being performed in each of the various levels of the permutation network. The input lines for any level within the permutation network are grouped such that all lines in a group have common elements in their binary vector indices except for those elements which are to be operated on in that level. Each such group of lines then goes to that group of data selectors which shares the same commonality of elements in their binary vector indices as do the lines. The lines in data selectors are then wired together with respect to the elements of the vector indices which are not common. That is, associated with every line L there is a binary vector $L$ consisting of those ordered elements in the binary vector L which are correspondingly dissimilar to those of the other lines in the group and corresponding to every data selector S there is a binary vector $S$ consisting of the ordered elements in the binary vector S which are dissimilar to the corresponding elements of the binary vectors of the other data selectors in the group. The wires within a group are then wired to the data selectors in the corresponding group such that line L goes to data input B of data selector S in accordance with the formula $D = L \oplus S$.

It should be noted in applying these wiring rules that the number of lines or data selectors that will appear in a group will be equal to the input capacity of the data selectors used in construction of the permutation network. If K-channel binary coded data selectors are used then the data selectors and their input lines will be grouped in groups of K and the number of elements in the binary vector L which will be operated upon in any level of the permutation network will be equal to $\log_2 K$. Consequently, the binary vector LS will contain $\log_2 K$ elements which will appear in the same order relative to each other as they did in the vectors $L, S$ respectively. For example, if in one level of the permutation network the elements $l_4$, $l_5$ of the vector L are to be operated upon, then $L = (l_5, l_4)$ and $S = (s_5, s_4)$; consequently, $D = (l_5 \oplus s_5, l_4 \oplus s_4)$. By following these wiring rules throughout, a permutation network may be readily created whereby the data contained in any position P in a data interface may be transferred through the permutation network to an output position M in the memory array in accordance with the formula $P = X \oplus M$ where X is an n-element binary code.

The associative array 12 provides four basic operations within the system. These operations may be grouped into the following categories: reads, writes, logical, and resolve address.

Data is read from the MDA memory 34 in either the bit or word mode. The lineal order of the data read from the memory is arranged in the permutation network 44, and is then channeled to either the response store 36, the parallel output lines of the parallel input/output 14, or the argument register. All such reading operations from the MDA memory 34 are non-destructive. When data is read from the MDA memory 34 into the response store 36, operations may then be performed upon this data before it is read out on the parallel output lines 14.

Data is written into the MDA memory 34 in either the bit or word mode. The data, regardless of the source, may be written through a mask which is designated by the state of the M flip-flops of the response store. The mask alows access to certain bits to be written while the state of the other accessed bits, those masked, remain unchanged. The data to be written may come from either the response store 36, the parallel input lines 14, or the argument register 56. The response store 36 may also be loaded with the contents of the parallel input lines 14 or the argument register 56.

Certain logical and arithmetic operations such as exact match search and add fields may be performed upon the data in the response store. By controlling the response store, data read from the MDA memory 34 may be logically combined with the contents of the response store 36 to accomplish these ends. Data from the argument register 56, the parallel input 14, or the MDA memory 34 may be logically ANDed, ORed, or exclusive-ORed with the previous contents of the response store 36. Data may also be moved among the response store elements within the associative array 12.

In many operations it is desirable that the address of the first word to respond to a given criteria be made avaiable for further operations. The response store 36 continuously resolves the addresses of words responding to given criteria such that the first respondoer to a given operation is available.

The manner of achieving the four above mentioned basic operations of the associative array 12 may now be summarized. In each associative array operation an input to the permutation network is selected. The inputs may include any one of the following:

1. A bit slice containing one bit from each of the $2^n$ words in the MDA memory 34,
2. A word slice containing all $2^n$ bits of one MDA memory word,
3. The contents of the $2^n$ M flip-flops 42,
4. The contents of the $2^n$ Y flip-flops 40,
5. The contents of the $2^n$ X flip-flops 38,
6. A $2^n$ - bit parallel input from the input/output lines 14, or
7. The contents of the argument register 56 contained in AP control 16.

The selected input is transmitted through the permutation network 44, which shifts or permutes the lineal order of the data in a manner controlled by the operation. The $2^n$ - bit output of the permutation network 34 is then communicated to one or more of the following:

1. The MDA memory 34 which stores it as a bit slice
2. The MDA memory 34 which stores it as a word slice
3. The M flip-flops 42 which store it as a new mask
4. The Y flip-flops 40 which use it in a logical operation to modify their contents
5. The X flip-flops 38 which use it in a logical operation along with the contents of the Y flip-flops to modify their contents
6. The parallel output lines 14, or
7. The argument register 56 of AP control 16.

As indicated in FIG. 1, the instant invention comprises a plurality of associative arrays 12. Each such associative array comprises an MDA memory 34, a response store 36, a permutation network 44, and permutation input selection gating 46 whereby each associative array 12 may read or write data, perform logical operations upon the data, and resolve the addresses of responders to the operations. All such functions of the associative array 12 are performed in parallel upon $2^n$ bits simultaneously. The number of such arrays required in a system is dependent upon the size and number of data sources to be serviced. The actual control of the elements of the associative array 12 and the relationship that the associative array 12 has toward other elements of the system will be fully described hereinafter.

The second of the three memory systems comprising the instant invention is the AP control memory 18. The main function of this memory is to store AP control instructions. It is also capable of storing items of data and acting as a buffer between AP control 16 and other elements of the system. Since the control memory is separate from the associative arrays 12, AP control memory 18 cycle time can overlap that of the associative arrays 12. The fast execution times of AP control 16, described hereinafter, imply that a fast memory is needed. To put all of the AP control programs in such a fast memory is prohibitively expensive, so AP control memory 18 is divided into sections. Three fast, small sections called pages hold the current AP program segments and a slower large section holds the rest of the AP program. A program pager 24 is included in the instant system to facilitate the transfer of instructions from the slow large section to the fast smaller sections of the AP control memory 18.

Although any number of page memories may be included in the AP control memory 18, the preferred embodiment requires three such memories. Each page memory uses fast bi-polar solid-state elements. In normal operations, the first page would contain a library of commonly used micro-programs while pages 2 and 3 would be used in a ping-pong fashion with AP control 16 reading instructions out of one page while the other page is loaded by means of the program pager 24. Each page memory has a port switch, a part of memory port logic 26, which allows it to be connected to one of three busses. At any given time a page memory may be 1. connected to the instruction bus which allows AP control 16 to read instructions from the page, or
2. To the pager bus which allows the program pager to load the page, or
3. To the sequential bus which allows sequential control and memory 20 to read items from the page.

The high-speed data buffer (HSDB) is a section of AP control memory 18 using fast bi-polar solid-state elements. All busses which can access AP control memory 18 can access the HSDB making it a convenient place to store data and instruction items which need to be accessed quickly by different elements of the system. The HSDB has a priority port switch, a part of memory port logic 26, which resolves any conflict between busses competing for access to the HSDB. Each memory cycle is given to the highest priority bus requesting HSDB access while other busses requesting such access wait for subsequent memory cycles.

The largest portion of AP control memory 18 is the bulk core memory which uses non-volatile core storage. This meeory is accessible to all busses which can access AP control memory 18, a priority port switch, a part of memory port logic 26, giving each memory cycle to the highest priority bus requesting a bulk core access. Since it is large and non-volatile, the bulk core memory is useful for storing the AP control programs. Although the bulk core memory is considerably slower in cycle time than the page memories, the use of proper programming techniques make it possible to deal portions of the AP program from the bulk core memory to the faster page memories for further use by AP control 16 such that the system will hardly ever wait for a program segment. That is, while AP control 16 is receiving a program segment from one of the pages, the other can be loaded by the bulk core memory such that that page will be available to AP control 16 when the latter is finished with the first page. It should also be noted that since the bulk core memory is accessible by all busses accessing AP control memory 18, it is also useful as a buffer for data items which do not require the higher speed of the HSDB.

AP control memory 18 also provides for direct memory access (DMA) 28 to external memory sources. These external memory sources may be desirable in lieu of greater storage capacity in the page memories or the HSDB. Direct access to a host computer memory allows that memory to act as part of the AP control memory, as well as a host computer memory. Items in the host memory are equally accessible by a host computer and the instant system, thus reducing the need for a buffered I/O transfer between the two. A wide variety of computers are amenable to such a situation, such as the Xerox Data Systems, Sigma 5. A priority port switch, a part of memory port logic 26, resolves any inter-bus conflicts which may arise in seeking access to the host memory. A buffered input/output (BIO) 30 is provided for tying several different types of peripherals into the AP control memory 18. In addition, the BIO can be used to transfer blocks of data and/or programs between the AP control memory 18 and the host memory.

As can be seen, the AP control memory 18 provides a broad base of programming capability for the instant system. It comprises a wide range of elements and allows access to external sources such that the instant system may be economically provided with an extremely large source of rapidly accessible program commands and intermediate data.

The last memory element of the instant system, is contained in the sequential control and memory 20. This element of the system contains a sequential processor (SP) with a suitable memory, input/output means, and interface logic to connect the SP to other elements of the system. The sequential control and memory 20 is used to provide:

1. A means to initially load the AP control memory 18,
2. A communication link between the operator and the system for on-line control and monitoring,
3. Off-line capabilities for assembling and debugging programs,
4. Control for system maintenance and diagnostic program routines,
5. Sequential arithmetic capability, and
6. Housekeeping capabilities.

Provisions are made for four distinct forms of communication between the sequential control and memory 20 and other elements of the system. First, sequential control amd memory 20 can read and write AP control memory 18 data. Secondly, to assist program debugging and hardware maintenance, certain of the system's registers can be read by sequential control and memory 20 by reading certain bus addresses. Thirdly, the sequential control memory 20 issues external function commands 32 described further hereinafter. Fourthly, the sequential control memory 20 can accept interrupts from other system elements. These interrupts may arise from error detection, a panel interrupt button for use by the operator, or external functions.

In general, the sequential control and memory 20 provides the means for initializing the system, loading the programs, activating and deactivating AP control 16, issuing interrupts, receiving interrupts from error detection means throughout the system, and providing other housekeeping tasks.

The three main memory elements in the system described herein above each perform vitally important distinct functions. The associative arrays 12 provide for the storage of data such that parallel access may be made thereto in either a word-oriented mode or a bit-oriented mode, and further provides for parallel operations upon such data. The AP control memory 18 provides storage and rapid accessibility to the system programs and temporary storage for intermediate data. The sequential control and memory 20 provides for initialization of the entire system, provides for the interjection of external commands, and generally provides for the basic housekeeping tasks of the entire system.

AP CONTROL 16

Figure 3:
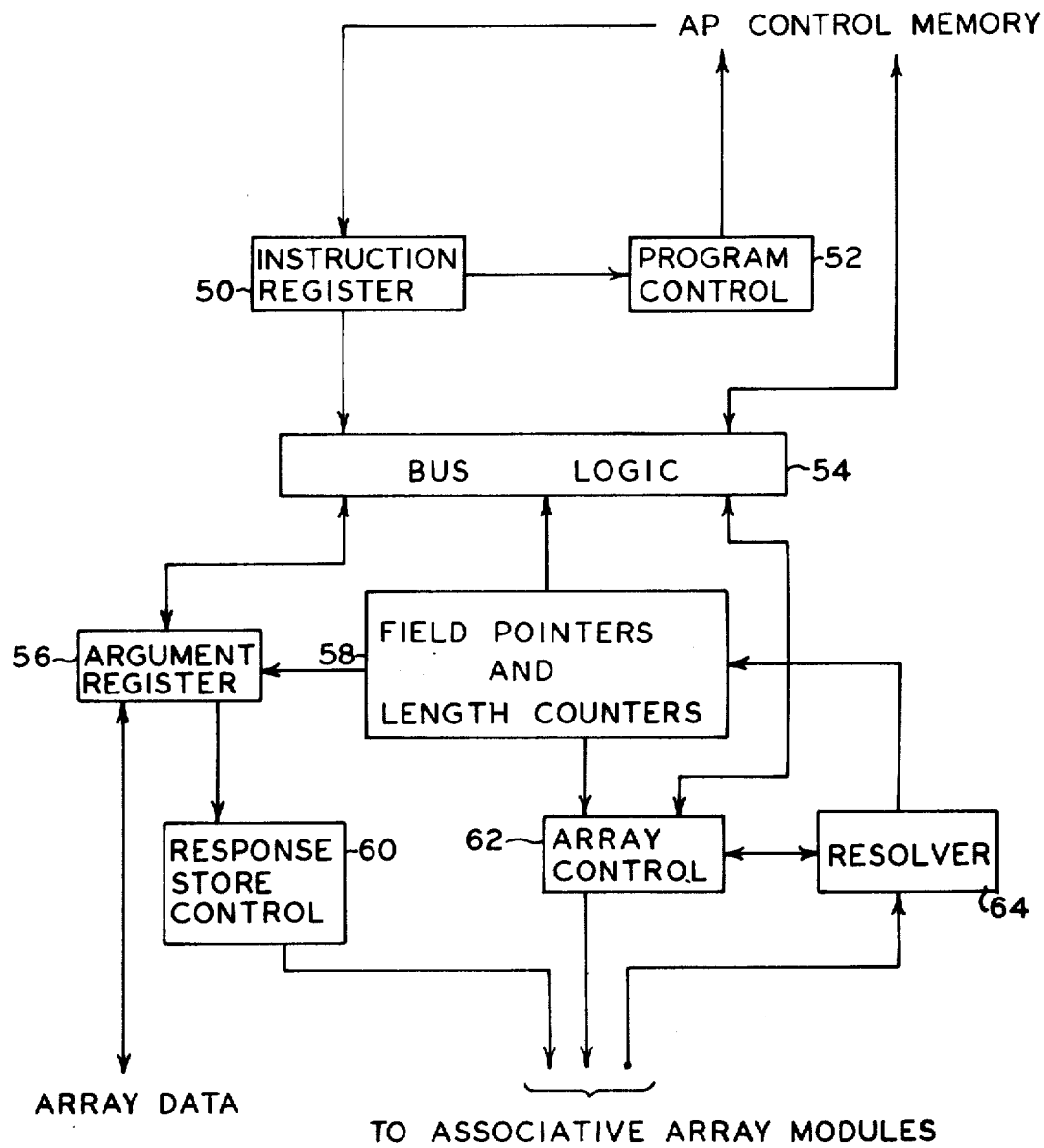
FIG. 3 illustrates the block diagram of the AP control.

The AP control 16 fetches its operations from the AP control memory 18. AP control 16 is directly responsible for manipulation of data within the associative arrays 12 under control of the program contained within the AP control memory 18. Associative operations are coordinated and controlled by AP control 16 which, as shown in FIG. 3, comprises the following basic sections: instruction register 50, program control 52, bus logic 54, argument register 56, field pointers and length counters 58, response store control 60, array control 62, and resolver 64.

Instructions are loaded into the instruction register 50 from AP control memory 18, such that at any point in time the instruction register will contain the instruction being executed by the system. The sequence in which the instructions are read from the AP control memory 18 to the instruction register 50 is controlled directly by program control 52, which comprises: a program counter containing the address of the instruction being read from control memory, a start loop marker or register used to store the first address of the loop whenever a loop instruction is executed, an end loop marker or register used to store the last address of an instruction loop, a comparator to compare the address contained in the end loop mark register to that in the program counter, and a status register, containing the interrupt mask for the AP control interrupts used in the system.

The bus logic 54 provides a common data path for all pertinent registers of AP control 16 and the data bus from AP control memory 18. The bus logic 54 is capable of shifting the bus data, the shift being controlled by the instruction moving the data.

The argument register 56 may contain the argument for a search operation performed on the associative arrays 12, input data to be written into the arrays, or output data read from the arrays. The array output data is loaded into the argument register 56 through a mask generated therein. The use of the mask allows the formating of an output word from the associative arrays 12 from non-contiguous data in the array.

In the preferred embodiment of the instant system, field pointers and length counters 58 comprises three bi-directional counters into which the array, bit, and word addresses associated with any given operation are loaded, and two field length counters to control the number of cycles for a given instruction loop such as search, add fields, or multiply.

The response store control 60 controls the logical function and timing of the response store 36. The former comprises a control line conditioner which generates the control line signals required to manipulate the latter. The control line signals are generates as a function of the contents of the instruction register, the argument register, and the inclusive or output of the resolver 64. A control line buffer controls the timing of the control line signals transmitted to the associative arrays 12.

Array control 62 controls those lines to the associative arrays 12 not controlled by the response store control 60. Array control 62 comprises an array select register whereby the associative arrays 12 to be operated upon may be made available to access, array address select logic for accessing any of the particular arrays enabled by the array select register, array mode logic whereby determination as to bit mode or word mode accessing may be made, mask address logic for controlling the position of the write mask within the associative arrays 12, and shift control logic for generating the control signals required by the associative arrays 12 for permuting, shifting, or mirroring the lineal order of the data associated with the arrays.

The resolver 64 contains the logic whereby the array address and the word address of the most significant responder to a given operation may be resolved. Generally, the responders will indicate those words satisfying some search criteria. The resolver then loads the array address and the word address of the responder into the field pointers of field pointers and length counters 58 such that subsequent operations may be performed on the first responder without affecting other words.

In general then it can be seen that AP control 16 is directly responsible for the manipulation of data within the associative arrays 12 under the control of the program contained within the AP control memory 18. The simultaneous control of any of all of the associative arrays 12 may be achieved through AP control 16 which uniquely comprises an arrangement of registers, counters, and high-speed logic devices.

The program pager 24, referred to hereinabove, loads the high-speed page memories from the lower speed parts of the AP control memory. The program pager performs these transfers independent of AP control such that while AP control is executing a program segment out of one page of memory, the program pager 24 can be loading another page of memory with a future program segment. Each page memory has a port switch, a part of memory port logic 26, to prevent AP control 16 from jumping into a segment before the pager has loaded it. Pager operation is initiated by external function codes. Under standard programming procedure, sequential control and memory 20 starts the first pager operation to load the standard sub-routines and initial program segments into the page memories and then AP control 16 starts the later program operations to load other program segments when they are required. Provisions have been made whereby the program pager may instantaneously stop the loading of any given program into a page, and begin the loading of another program is such is required. This situation is most likely to occur in programs containing many braching networks. The prgram pager contains three distinct registers. A GET address register holds the AP control memory address from which the next source word is to be moved or from which the next pager command is to come. a PUT address register holds the address of the memory location into which the next word is to be put during a move data operation. A count register indicates the number of words still to be transferred during a transfer operation. In general, then, the program pager 24 contains the source address, the destination address, the number of transfers yet to be performed, and the means for loading the high speed page memories from the lower speed parts of the AP control memory 18.

It has been shown that the instant invention presents a novel solid state associative processor organization flexible in size, rapid in processing time, accurate in operation, inexpensive to build, and adaptable to numerous uses. The system comprises the arrangement of a plurality of associative arrays each capable of the parallel processing of a large volume of data, a control memory system comprising a large variety of memory elements each selected as to its characteristics of size, speed, volatility, and expense, and input/output system whereby external data or commands may be received from any one of numerous peripheral sources, and whereby large quantities of data may be simultaneously written into or read from the associative arrays, and a control network whereby the associative arrays may be controlled in accordance with the programs contained in the control memory network in such a manner that the associative arrays will receive control instructions with such rapidity that they will never have to wait for a command.

While in accordance with the Patent Statutes only the best known and preferred embodiment of the invention has been presented and described in detail, it is to be understood that the invention is not to be limited thereto or thereby but that the true scope of the invention is defined in the appended claims.

What is claimed is:

1. A digital computer organization, comprising:

a memory array comprised of a plurality of address line encoded binary solid state memory modules and containing data bit storage elements wherein data may be stored as bit-comprised words with bit B of module M containing bit B of word W in accordance with the formula $M = B \oplus W$ and wherein B, M, and W are n-element binary vectors, respectively unique for each bit, module, and word, and where n is an integer greater than 1;

a logic circuit means connected to the memory array for simultaneously performing logic and arithmetic operations on all accessed data bits;

a coding circuit; and permuting circuit means connected to the coding circuit and between the memory array and logic circuit means for ordering the lineal order of data into and out of the memory array in accordance with the output of the coding circuit.

2. The digital computer organization as recited in claim 1 wherein said logic circuit means comprises a plurality of identical circuits, each capable of performing 16 unique arithmetic and logic operations.

3. The digital computer organization as recited in claim 2 wherein said logic circuit means includes three latching means, a first latching means for receiving and storing bits of data, a second latching means for storing intermediate results from said logic operations, and a third latching means for masking the accessing of the data storage bits of the memory array.

4. The digital computer organization as recited in claim 3 wherein said permuting circuit means is connected to said coding circuit and includes a plurality of data selectors having data input lines, one data output line, and channel select input lines for controlling the transfer of data from the input lines to the output line.

5. The digital computer organization as recited in claim 4 wherein the coding circuit applies an $n$-element mode of access code $X$ to the channel select input lines to control the passage of data through the permuting circuit means from a data source position $P$ to a data destination $M$ in accordance with the formula $P = M \oplus X$ where $M$ and $P$ are n-element binary vectors unique for each data source position and each data destination.

* * * * *